United States Patent [19]
Harris

[11] Patent Number: 6,089,712
[45] Date of Patent: Jul. 18, 2000

[54] COLOR DISCRIMINATION

[76] Inventor: David Andrew Harris, The Barn, Green Lane, Ewloe Green, Flintshire, CH5 3BP, United Kingdom

[21] Appl. No.: 09/319,322

[22] PCT Filed: Nov. 27, 1997

[86] PCT No.: PCT/GB97/03253

§ 371 Date: Jun. 3, 1999

§ 102(e) Date: Jun. 3, 1999

[87] PCT Pub. No.: WO98/25173

PCT Pub. Date: Jun. 11, 1998

[30] Foreign Application Priority Data

Dec. 4, 1996 [GB] United Kingdom .................... 9625147

[51] Int. Cl.⁷ ....................................................... G02C 7/04
[52] U.S. Cl. ................................................................ 351/162
[58] Field of Search .................................. 351/41, 44, 45, 351/46, 158, 163, 165, 162, 160 H, 160 R; 264/1.1, 2.1, 2.6, 2.7

[56] References Cited

U.S. PATENT DOCUMENTS 5,617,154  4/1997  Hoffman .................................. 351/162
5,846,457  12/1998  Hoffman .................................. 264/2.1
5,917,573  7/1999  Davis ......................................... 351/46

*Primary Examiner*—George Manuel
*Attorney, Agent, or Firm*—Maksymonko & Slater

[57] ABSTRACT

Color discrimination may be improved by fitting to a patient's eye a plastics contact lens having a tinted central circular section. The optimum tint is determined by testing the effects of a sequence of differently tinted lens on a patient.

11 Claims, 2 Drawing Sheets

COLOR DISCRIMINATION

This invention concerns a method and device for improving colour discrimination.

In the United Kingdom colour blindness affects about 8% of the male population and about ½% of the female population. There are two main types of colour blindness. Deuteranopia (green deficiency) is the most common occuring in about 75% of cases and protanopia (red deficiency) occurs in about 25% of cases. There is a third condition, monochromatism, in which no colours are seen, that occurs in a small number of cases.

Attempts have been made to overcome the effects of colour blindness by fitting patients with a coloured contact lens. U.S. Pat. No. 3,586,423 described a method and device for improving colour discrimination in persons having a substantial amount of deficiency in their ability to discriminate between red and green colours. A rigid red coloured contact lens was applied to one eye.

That contact lens had a number of drawbacks. The first was that it was only useful for some patients. Secondly, the lens was cosmetically very poor and, thirdly, being hard, exhibited poor oxygen transmission.

U.S. Pat. No. 4,998,817 also discloses a contact lens for improving colour perception of patients suffering from colour blindness. The lens has central circular red coloured section matching the pupil eye.

An object of this invention is to provide a method and apparatus for use in improving colour discrimination without the aforementioned drawbacks.

According to a first aspect of this invention there is provided a it of parts for use in testing for correction of colour discrimination in a patient comprising a plurality of plastics contact lenses each having a substantially central tinted section of a different tint to the others.

According to a second aspect of the invention there is provided a method of improving colour discrimination of a patient by applying to at least one of the patient's eyes in sequence differently tinted contact lenses to assess which tint has optimum effect, each lens having a substantially central tinted section.

The substantially central coloured section of a contact lens for the invention will usually be circular and may be sized to match the normal pupil size of the patient. The colouring may be chosen to suit the particular colour recognition deficiency of the patient. Every patient will have a differing degree of colour blindness that may be better alleviated by a different colour and/or colour density than another patient. Therefore, the hue and/or the density of the colouration may be varied from one patient to another.

Additionally, a contact lens used in the invention may also be a prescriptive lens to correct any other vision impairment suffered by the patient.

A contact lens used in the invention will usually be worn in one eye, in which case either no lens or a clear prescriptive lens is worn in the other eye. However, for some patients it may be necessary for a tinted contact lens to be worn in both eyes. Ideally the correct eye, colour, filter size and contact lens fit will be decided following a clinical consultation.

The contact lens used in the invention is preferably made of a soft, high water content plastics material, such as Filcon 4A. The colour of the lens is preferably applied as a tint to the lens. The tint may be applied in a conventional manner.

The method of the invention may involve various tests and investigations. Firstly it is desirable to establish whether the patient is suitable for wearing contact lenses i.e. those with pathologically dry eyes are most unsuitable. Secondly, colour vision will be assessed by any convenient means. Then, a patient can be assessed for the appropriate contact lens of the invention.

In order to carry out the latter assessment, it is envisaged that a selection of different contact lenses of the invention will be provided, preferably in a single container and preferably in a given order, whereby a practitioner can try each colour/density available until the optimum lens for the patient is ascertained.

The preferred selection of contact lenses for testing a patient will include those coloured amethyst, orange, red, yellow, green and blue. Variations in colour and density may also be included in a test set.

A possible test sequence of lens tints for sufferers of both protanopia and deuteranopia is amethyst, orange, magenta, yellow, aqua, green and red in one eye and, if necessary, the same sequence with lenses in both eyes. An alternative may be to use appropriately coloured spectacle type filters held up to the eye or inserted into an optician's trial frame in the same sequence in order to assess the effect instead of inserting the contact lenses.

The first lens is fitted in the non-dominant eye initially but if the effect is poor, the lens is then switched to the dominant eye. If the patient is able to obtain a good result in the non-dominant eye, that is preferable in order to reduce vision distortion. In either eye the darkest density of contact lens is tried firstly followed by successively lighter density lenses, if the patient complains of the dark filter in poor lighting. Sufferers from typical monochromatism should start with a pair of amethyst lenses. For some patients contact lenses are unsuitable. For those patients, spectacles may be suitable. However, to have a pair of spectacles with one lens coloured and the other plain would be cosmetically undesirable.

A third aspect of the invention provides a pair of spectacles for improving colour discrimination comprising a frame supporting a pair of lenses, one of which is coloured and the other is selected from neutrally tinted and coloured lenses, both lenses having a mirror tint applied on their outer faces.

The colour for the lens will as with the contact lens of the invention be chosen by means of individual testing of a patient along the same lines as for the contact lenses of the invention. The lenses for the spectacles of the invention may, of course be plain or prescriptive as required.

Because both lens are mirror tinted, to an onlooker the spectacles appear to be ordinary sunglasses with no difference being apparent as to the colour of the lenses.

It is believed that the contact lenses and spectacles of the invention may also be useful in counteracting dyslexia. Determining the appropriate lens colour may be achieved in a similar manner to that used for colour discrimination using text as an assessment medium.

This invention will now be further described, by way of example only, with reference to the accompanying drawings, in which.

Figure 1:
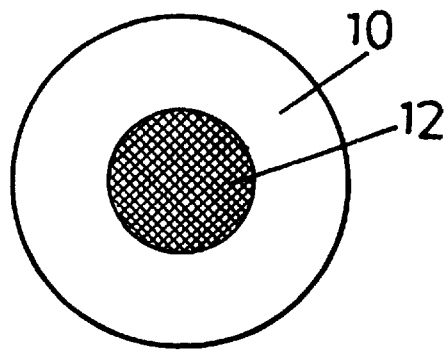
FIG. 1 is a plan view of a contact lens of the invention.
Figure 2:
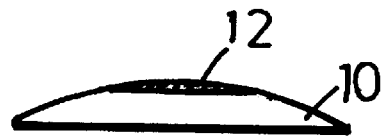
FIG. 2 is a side view of a contact lens of the invention.

Referring to FIGS. 1 and 2 of the accompanying drawings, a contact lens 10 for improving colour discrimination is made of soft plastics material with a high water content. The lens 10 is clear apart from a substantially central circular section 12 that is tinted. When being worn the coloured section 12 will be over the pupil of the wearer. The tint is applied in any suitable way. Typically, the lens will be held in a jig with an opening over the area to be tinted, the tint applied to that area as a liquid and the lens removed from the jig once the tint has been applied. A set of such lenses each with a different colour or density of tint may be provided to enable a practitioner to establish the correct tint for a patient's condition by testing with each lens in turn until the optimum result is achieved.

The size of the area of the tint will usually be about that of the patient's normal pupil size or marginally larger say by about 0.5 to 1 mm on the radius. In other words, the size of that area may be chosen to suit a particular patient. Then when the contact lens is worn, the tinted area is not easily noticed, so that there is little or no adverse cosmetic effect. The following is a description of the fitting of a contact lens 10 to a patient.

With the use of a full series of lenses a practitioner is able to determine the correct colour and density of the tint, which produces the best result for the individual colour deficient patient. Pre-trial assessment of the patient should go along the lines of a standard soft contact lens fitting. This will include refraction, slit lamp examination and keratometry. Following this, the colour vision should be assessed and this can be by any convenient means. A set of pseudo-isochromatic plates are useful later on as a demonstration of the benefits of the lens to the patient.

It is important to explain to the patient that the lens is an aid to defective colour vision and not a cure. When the lens is removed, they will still retain their colour vision deficiency. Additionally, the lens is intended to be an aid in real world situations. Their appreciation of colours in most types of environments will be very much enhanced and, although their scores in colour vision tests may be very much improved, that is not the sole intention of the lens.

Figure 4:
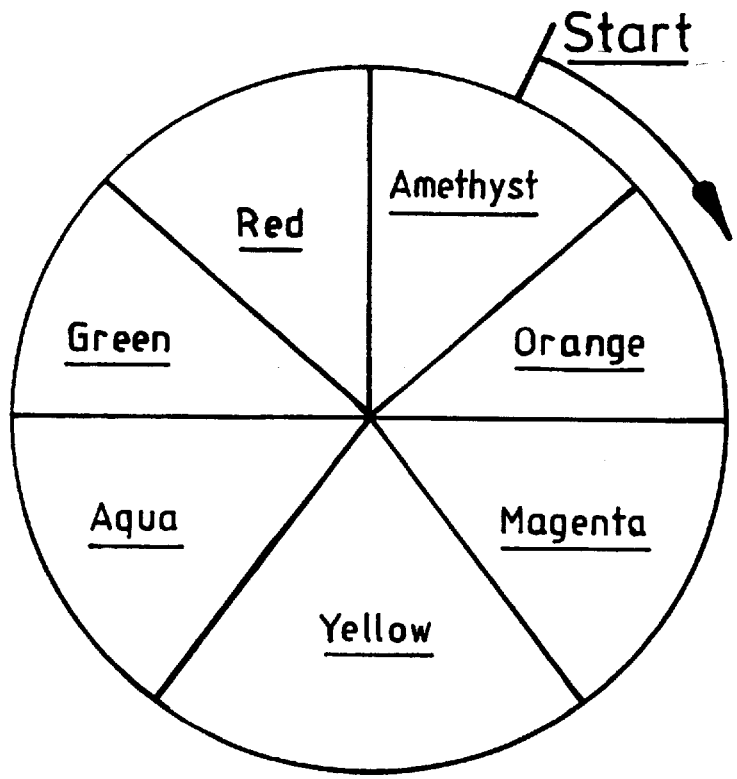
FIG. 4 is a chart showing a suggested sequence of tints to be tried on a patient.

If the patient is deuteranomolous (about 6% of the male population), then the patient should be initially fitted with a dark amethyst lens in the non-dominant eye. The attention should then be drawn to a brightly coloured object, ideally one which is kept specially for the purpose. A selection of different coloured flourescent cards is ideal. These should be well illuminated. Patients should then be asked if there is a change in the appearance of the cards when the eye with the contact lens is covered, (that is their normal colour vision), and when they are using both eyes together. If the lens is having an effect, they may report that there is an increase in brightness using both eyes or they may report a 3-D effect and flourescence. If there is little or no effect, then the lens should be changed to the dominant eye. If there is still no effect, then the colour should be changed. If after trying the combination of colours in the sequence shown in FIG. 4 of the accompanying drawings there is still little effect, then the patient should be sent on a trial using the lens which gives best effect in the dominant eye.

Once the lens has been selected for the trial, patients should be sent out for around an hour to an hour and a half, to allow the effect of the lens to come out and to give them ample opportunity to record their subjective comments. They should be asked to spend as much time outside in well illuminated areas as possible and to concentrate on looking at colours. A local park or garden centre is ideal for this purpose as a wide range of subtle colours are available, which give the patient the best change to see the effect of the lens.

In order to compare their normal colour vision with that of the lens effect they should, when viewing the object of regard, cover their eye with the contact lens in, which demonstrates their normal vision, then use both eyes together. They should be warned that covering the eye without the lens, so that they are just looking through the lens, will do little other than distort their colour vision. Improvement in colour appreciation is a binocular effect and cannot normally be seen using one eye only.

If the patient has a friend or relative accompanying them who is normally sighted, they should be warned that the lens patient undergoes a learning curve which may take an excess of three months before they are able to correctly identify colours. Thus, colour naming should not be part of the trial. When the patient has returned from the trial, they should be asked for their comments, and a summary should be recorded on the record card. If appropriate, confirmatory colour vision testing should be carried out using pseudo-chromatic plate or simple colour matching with coloured objects. At this stage, this should simply just be a demonstration of the effects of the lens. If the practitioner feels that there can be further improvement in the effect of the lens, then the process can be repeated perhaps in a shorter trial with a different coloured lens. In a number of cases, a pair of lenses may be necessary, and in these instances it is advisable to use a lightest density tint in the dominant eye in order to minimise difficulties when the patient enters various areas of poor illumination.

Figure 5:
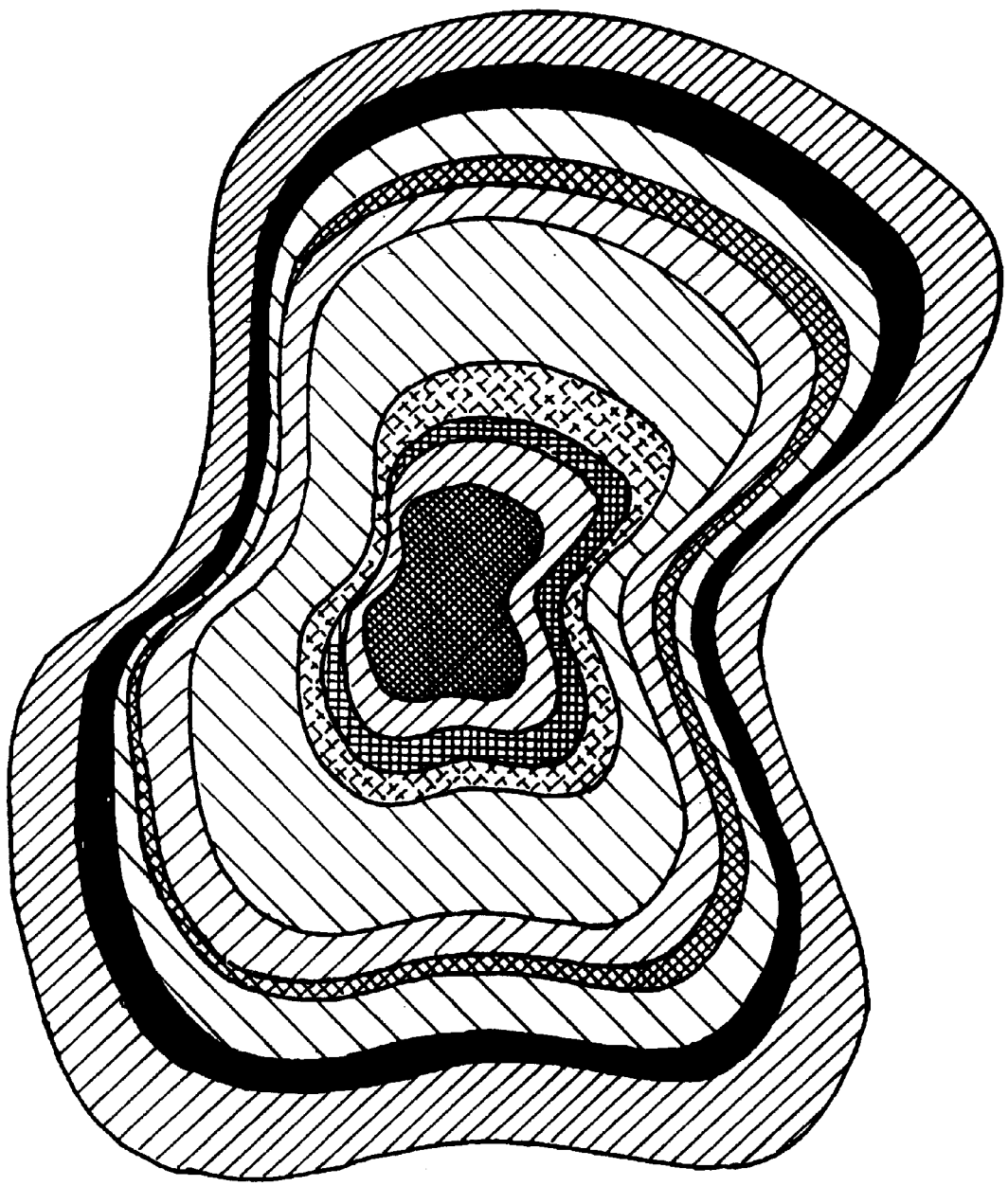
FIG. 5 shows a test image.

Alternatively, an image of the type shown in FIG. 5 of the drawings may be used for testing purposes. The image has a sequence of colour changes from the outside starting with shades of blue through shades of green, yellow, brown to red in the centre. The image may be on a sheet of card or paper or may be displayed on a computer screen.

A patient views the coloured image with both eyes open and trial lenses are held in front of the non-dominant eye. The patient reports changes in the image as each lens is held in place, and the lens that produces the greatest effect is the hue used for the first contact lens.

When the non-dominant eye has been tested, the appropriate contact lens may be inserted and then the procedure is repeated with the dominant eye. This determines whether or not a second tinted lens is required. If there is no improvement with a second lens then the patient only needs to trial one.

If spectacles are being prescribed, it is still preferable to undertake the trial using contact lenses to arrive at the correct hue and density for the patient, however a clip-on spectacle frame may be used to send the patient out with sample trial lenses in.

In this case, the range of seven hues, plus the neutral density grey, are kept in mirrored form and the appropriate lens is inserted into the clip-on and then either attached to the patients own spectacle frame if they have one, or to a frame kept especially for the purpose. They can then wear this for the trial period in the same way as the contact lens.

Figure 3:
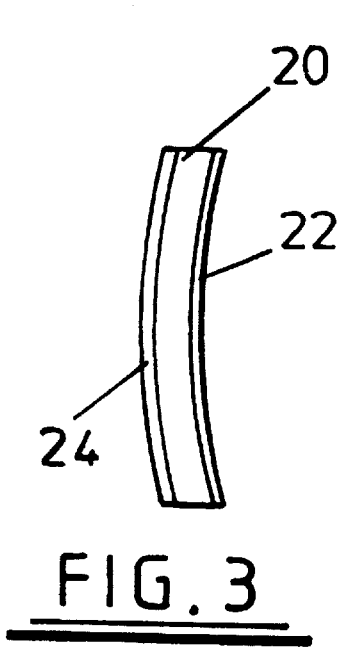
FIG. 3 is a section through a lens for a pair of spectacles of the invention.

Referring to FIG. 3 of the drawings, a similar system can be adapted for spectacles, as some patients cannot wear contact lenses. Thus, instead of a tinted area on the contact lens, one or possibly both spectacle lenses 20 will have a tint 22 applied to the inner face of the lens. The choice of tint and density will be made in the same way as described above in respect of contact lenses. However, in the case of spectacles the other lens will have a neutral tint applied to the inner face of the lens and both lenses will have a mirror tint 24 applied to their outer faces. Then, the spectacles will appear to an onlooker to be simply a pair of sunglasses, so that there is little or no adverse cosmetic effect.

What is claimed is:

1. A kit of parts for use in testing for correction of colour discrimination in a patient comprising a plurality of plastic contacts lenses each having a substantially central tinted section of a different tint to the others, said kit of plastic contacts including tinted contacts defining a predetermined sequence that may establish improved colour discrimination in connection with one eve of the patient whereby a differently tinted or clear contact may be used in connection with the other eye of the patient.

2. A kit of parts as claimed in claim 1, wherein the tinted central section of each lens is circular.

3. A kit of parts as claimed in claim 1 or 2, wherein the tinted central section of each lens is sized to match a normal pupil size.

4. A kit of parts as claimed in claim 1, 2 or 3, wherein the contact lenses are made of a soft high water content plastics material.

5. A kit of parts as claimed in any one of claims 1 to 4, wherein the differently tinted lenses are coloured amethyst, orange, red, yellow, green and blue respectively.

6. A kit of parts as claimed in any one of claims 1 to 5 further comprising a coloured image having a sequence of colour changes from the outside starting with shades of blue through green, yellow, brown to red in the centre.

7. A method of improving colour discrimination of a patient by applying to at least one of the patient's eyes in predetermined sequence differently tinted contact lenses to assess which tint has optimum effect with respect to each eye where a tinted contact lens produces an improved effect whereby the tinting of one eye may be different from the tinting of the other eye and whereby one eye may have a lens without tinting.

8. A method as claimed in claim 7, wherein the tinted section is circular.

9. A method as claimed in claim 7 or 8, including the step of testing the suitability of the patient to wear a contact lens.

10. A method of improving colour discrimination of a patient including the step of applying separately to each eye of the patient in predetermined sequence differently tinted contract lenses to assess which tint has optimum effect.

11. A method of improving colour discrimination of a patient including the step of applying to a least one of the patient's eyes in sequence differently tinted contact lenses to assess which tint has optimum effect, said step further characterized by firstly applying the contract lens to the patient's non-dominant eye.

* * * * *